(12) United States Patent
Karaoguz et al.

(10) Patent No.: US 7,680,494 B2
(45) Date of Patent: Mar. 16, 2010

(54) SERVICING OF WIRELESS TERMINAL PRINT JOB BY UNSUPPORTED PRINTER

(75) Inventors: Jeyhan Karaoguz, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 720 days.

(21) Appl. No.: 11/142,545

(22) Filed: Jun. 1, 2005

(65) Prior Publication Data
US 2006/0178139 A1    Aug. 10, 2006

Related U.S. Application Data

(60) Provisional application No. 60/651,287, filed on Feb. 9, 2005.

(51) Int. Cl.
*H04W 4/00* (2009.01)

(52) U.S. Cl. .............. 455/426.1; 455/426.2; 455/414.1; 358/1.15

(58) Field of Classification Search .............. 455/426.1, 455/426.2, 414.1; 358/1.15
See application file for complete search history.

(56) References Cited

U.S. PATENT DOCUMENTS

| | | | |
|---|---|---|---|
| 6,285,889 B1 * | 9/2001 | Nykanen et al. ............ 455/557 |
| 6,493,104 B1 * | 12/2002 | Cromer et al. ............. 358/1.15 |
| 2002/0065101 A1 * | 5/2002 | Picoult et al. ............... 455/556 |
| 2003/0227644 A1 * | 12/2003 | Ferlitsch ..................... 358/1.13 |
| 2004/0185882 A1 * | 9/2004 | Gecht et al. .................. 455/466 |
| 2004/0190042 A1 * | 9/2004 | Ferlitsch et al. ............ 358/1.15 |
| 2004/0203662 A1 * | 10/2004 | Boldon ..................... 455/414.1 |
| 2006/0072156 A1 * | 4/2006 | Shima ........................ 358/1.15 |

* cited by examiner

*Primary Examiner*—Patrick N Edouard
*Assistant Examiner*—Justin Y Lee
(74) *Attorney, Agent, or Firm*—Garlick Harrison & Markison; Bruce E. Garlick; Shayne X. Short (57) ABSTRACT

A wireless terminal having processing resources, a user interface including a user input device and a display, and a wireless interface causes a file to be printed to a destination printer that is unsupported by the wireless terminal. The processing resources communicatively couple to the wireless interface and to the user interface and are operable to receive a file via a servicing wireless network and the wireless interface, receive a request via the user interface to print the file, identify a destination printer, determine that the wireless terminal does not support printing of the file at the destination printer, identify a servicing device for processing of the file for printing at the destination printer, and transmit the file to the servicing device via the wireless interface and the servicing wireless network.

20 Claims, 7 Drawing Sheets

SERVICING OF WIRELESS TERMINAL PRINT JOB BY UNSUPPORTED PRINTER

CROSS REFERENCE TO RELATED APPLICATION

This application claims priority to U.S. Provisional Patent Application Ser. No. 60/651,287, filed Feb. 9, 2005, which is incorporated herein by reference for all purposes.

BACKGROUND OF THE INVENTION

1. Field of the Invention

The present invention relates generally to wireless communications; and more particularly to operations supported by a wireless terminal.

2. Description of Related Art

Communication systems are well known. Communication systems include both wired communication systems and wireless communication systems. Wired communication systems include the Public Switched Telephone Network (PSTN), Wide Area Networks (WANs), Local Area Networks (LANs), and other networks that use wired or optical media for the transmission of data. Wireless communication systems include cellular telephone systems, satellite communication systems, Wireless Wide Area Networks (WWANs), Wireless Local Area Networks (WLANs), Wireless Personal Area Networks (WPANs), and other networks that employ a wireless link between a serviced terminal and a network infrastructure or another wireless terminal. Of course, many communications are serviced using a combination of wireless communication systems and wired communication systems.

Wireless terminals were originally used to service only voice communications. However, wireless terminals now service data communications as well as voice communications. It is now common to use a wireless terminal to send and receive email, to send and receive text messages, and to access the Internet. In their operation, the wireless terminals receive files of many varied formats. A user of the wireless terminal may desire to obtain a hard copy of a received file for further use. While the user of the wireless terminal may be physically proximate a printer that is available for use, the wireless terminal may not possess printer drivers required to print the file at the proximately located printer. Further, because of the limited resources of the wireless terminal, it may not be reasonable to enable the wireless terminal to support the printer. Thus, there is a need for a system and method of operation that would a wireless terminal to service print jobs to printers that are unsupported by the wireless terminal.

BRIEF SUMMARY OF THE INVENTION

The present invention is directed to apparatus and methods of operation that are further described in the following Brief Description of the Drawings, the Detailed Description of the Invention, and the claims. Features and advantages of the present invention will become apparent from the following detailed description of the invention made with reference to the accompanying drawings.

DETAILED DESCRIPTION OF THE INVENTION

Figure 1:
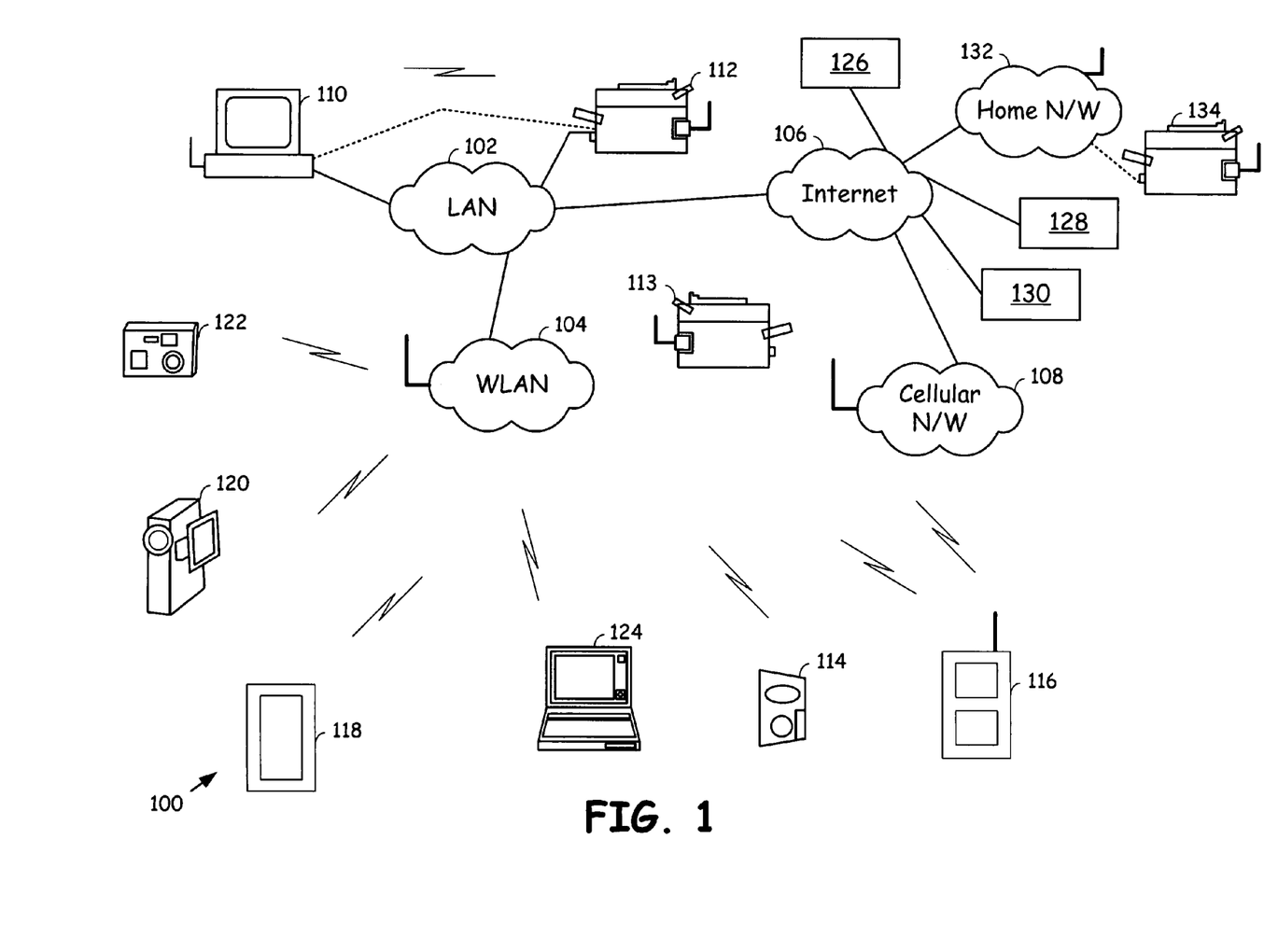
FIG. 1 is a system diagram illustrating a communication system that operates according to the present invention.

FIG. 1 is a system diagram illustrating a communication system 100 that operates according to the present invention. The communication system 100 includes a Local Area Network (LAN), a Wireless Local Area Network (WLAN), the Internet 106, and a cellular wireless network 108. The LAN 102, the WLAN 104, the Internet 106, and the cellular network 108 are communicatively coupled as indicated, or in another manner. Coupled to the LAN 102 are a computer 110 and a printer 112. Wirelessly coupled to the WLAN is printer 113. Each of the computer 110 and the printer 112 may also support wireless communications and may be directly coupled. Server computers 126, 128, and 130 couple to the Internet 106.

Figure 7:
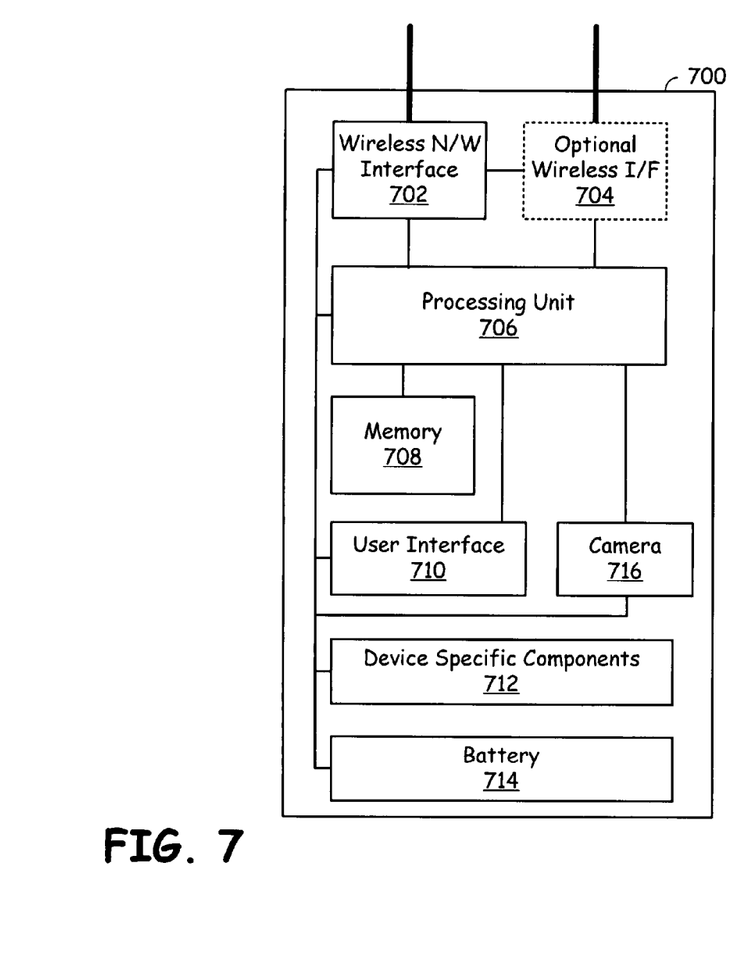
FIG. 7 is a block diagram illustrating a wireless terminal that operates according to the present invention.

A plurality of wirelessly terminals that may operate according to the present invention includes an MP3 player 114, a wireless telephone 116, a Personal Data Assistant (PDA) 118, a camcorder 120, a digital camera 122, and a laptop computer 124. The wireless terminals 114-122 support Wireless Personal Area Network (WPAN) communications, WLAN communications, Wireless Metropolitan Area Communications (WMAN), and/or cellular wireless communications. When the plurality of wireless terminals 114-122 form a WPAN, the plurality of wireless terminals 114-122 operate in a point-to-point communication scheme and support one or more of the Bluetooth operating standard, the IEEE 802.15 standard, or another WPAN operating standard. When the plurality of wireless terminals 114-122 form a WLAN, the plurality of wireless terminals 114-122 support one or more WLAN standards such as the IEEE 802.11a standard, IEEE 802.11b standard, IEEE 802.11g standard, the IEEE 802.11n standard, or another WLAN standard. WLAN communications may be supported by a Wireless Access Point (WAP) or by ad-hoc networking in which wireless terminals communicate directly with one another. When the plurality of wireless terminals 114-122 form a WMAN, the plurality of wireless terminals 114-122 may support the IEEE 802.16 standard, for example. When the plurality of wireless terminals 114-122 support cellular wireless communications they communicate with a base station and other infrastructure components and may operate according to a cellular standard such as the 1xRTT, 1xEV-DO, 1xEV-DV, GSM, GPRS, EDGE, UMTS, or other communication standards. Each of the plurality of wireless terminals 114-122 may support multiple communication standards and may support a plurality of WPAN, WLAN, WMAN, and cellular communications. Each of the wireless terminals 114-122 serviced within the wireless network 100 includes a wireless interface, a user input device, a display, a wireless interface, and processing resources. The particular example of a handheld portable wireless terminal is illustrated further with reference to FIG. 7. The wireless terminals 114-122 illustrated in FIG. 1 may of course include additional or differing components than those that are illustrated in FIG. 7.

According to the present invention, a wireless terminal, e.g., one of the wireless terminals 114-122 of FIG. 1 receives a file via a servicing wireless network. The servicing wireless network may be a WPAN, a WMAN, the WLAN 104, or the cellular network 108. After receiving this file, the wireless terminal 116 (WLAN telephone, WPAN telephone, WMAN telephone, or cellular telephone) receives a request from a user of the wireless terminal 116 to print the file. Because the wireless terminal 116 does not know particularly what printers are available, it may search for available printers. Upon resulting, the result of such search, the wireless terminal 116 identifies printers 112 and 113 that are available via the WLAN 104 or the cellular network 108 for the wireless telephone 116. From these available printers 112 and 113, the wireless terminal 116 selects a destination printer, e.g., printer 112.

Then, the wireless terminal 116 determines that it does not support the printing of the file at the destination printer 112. Such would be the case typically with the wireless terminal 116 not having loaded thereon printer drivers required to send a print job to the destination printer 112. Thus, in response to the short coming, the wireless terminal 116 identifies a servicing device for processing of the file for printing at the destination printer. This servicing device may be the computer 110, or any of servers 126, 128, or 130 that couple to the Internet 106. With the servicing device identified, the wireless terminal 116 transmits the file to the servicing device via the servicing wireless network. In one example, when the servicing device is the computer 110 coupled to LAN 102, the wireless terminal 116 transmits the file via the WLAN 104 and the LAN 102 to the computer 110. In an alternate example, the servicing device is the server computer 128. In such case, the wireless terminal 116 transmits the file to the servicing device 128 via the cellular network 108 and the Internet 106. Alternatively, the wireless terminal 116 may transmit the file to the servicing device 128 via the WLAN 104, the LAN 102, and the Internet 106.

According to one aspect to the present invention, the servicing device 110 or 128 processes the file to produce a processed print file. The servicing device 110 or 128 then transmits the processed print file directly to the printer 112 for printing. In an alternate operation, the servicing device 110 or 128 processes the file to produce the processed print file and then transmits the processed print file back to the wireless terminal 116 via a communication path that includes the servicing wireless network. The wireless terminal 116 then transmits the processed print file to the printer 112 for printing.

When the servicing device 110 or 128 transmits the processed print file directly to the printer 112, the wireless terminal 116 must notify the servicing device 128 of the network address or other identifier for the printer 112. In another operation, the wireless terminal 116 may interact with the servicing device 128 to discover the servicing printer 112 and to receive a network address of the servicing printer 112. Further, aspects of the present invention will be described further with reference to FIGS. 2-6. The particular construct of a wireless terminal that operates in conjunction with the system 100 of FIG. 1 will be described further with reference to FIG. 7.

Figure 2:
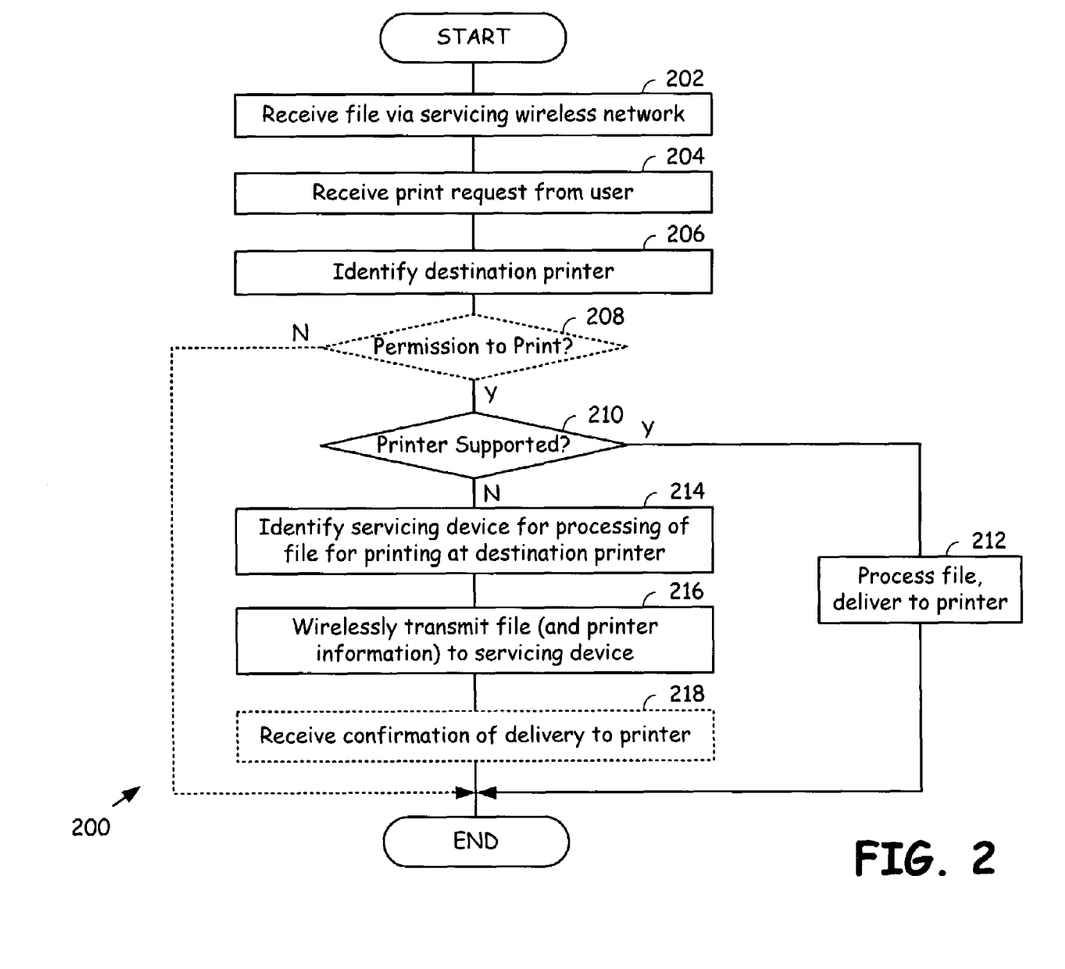
FIG. 2 is a flow chart illustrating operation according to one embodiment of the present invention.

FIG. 2 is a flow chart illustrating operation according to one embodiment of the present invention. Operation commences with the wireless terminal receiving a file via a servicing wireless network (Step 202). The file may be received as an email attachment, as a file downloaded from a server coupled to the Internet, as a file downloaded from a computer on the Internet, as a file delivered directly from another communication device, or via another mechanism. As the reader will fully appreciate, many differing types of files are transmitted nowadays between communication devices. Any of these types of files may be transmitted across a servicing wireless network and be received by the wireless terminal.

A user may desire to print the particular file for subsequent use in a hard copy format. Thus, operation continues with the wireless terminal receiving a request from its user to print the file (Step 204). In response to this print request, the wireless terminal will identify a destination printer (Step 206). In identifying the destination printer, the wireless terminal may identify more than one available printer by accessing its servicing network, e.g., WPAN, WMAN, WLAN 104 and/or cellular network 108. The wireless terminal then selects the destination printer based upon user input, which may be in response to the presentation of the identities of all potential destination printers via display of the wirless terminal.

The wireless terminal optionally determines whether it has permission to print at the destination printer (Step 208). When the wireless terminal does not have permission to print at the selected destination printer, operation ends. Alternately, operation may return to step 206 for selection of another destination printer. The wireless terminal next determines whether it can support a print job to the destination printer (Step 210). If the wireless terminal by itself can support the print job, as determined at Step 210, the wireless terminal processes the file to produce a processed file and delivers the processed file to the printer (Step 212). The printer in response thereto prints a hard copy of the processed file and operation ends.

If the wireless terminal does not support the destination printer, as determined at Step 210, the wireless terminal identifies a servicing device for processing of the file for printing at the destination printer (Step 214). Non support by the wireless terminal of the destination printer may be for any of a variety of reasons including not possessing printer drivers for the destination printer, not supporting a file type of the file, not currently having sufficient processing resources to service a print job, not currently having sufficient memory to service the print job, or another reason.

As was previously discussed with reference to FIG. 1, the servicing device may be computer 110 or one or servers 126-130 as shown in FIG. 1. The wireless terminal then transmits the file to the servicing device (Step 216). The wireless terminal may also transmit additional information to the servicing device such as printer type, network address of the printer, number of copies to be printed, particular formatting requirements for the file, and other information that would be required by the servicing device in preparing a processed print file support by this destination printer and in giving commands to the destination printer.

Then, optionally, the wireless terminal may receive confirmation of delivery of the processed print file to the printer from the servicing device (Step 218). This notification would be forwarded to the user of the wireless terminal to indicate that the print job is being processed by the printer. Based upon this information, the user of the wireless terminal may choose to physically go to the printer to pick out the hard copy, or to have another person to pick up the hard copy, or to provide directions to an operator of the printer to send the hard copy to another location. From Step 218 operation ends.

Figure 3A:
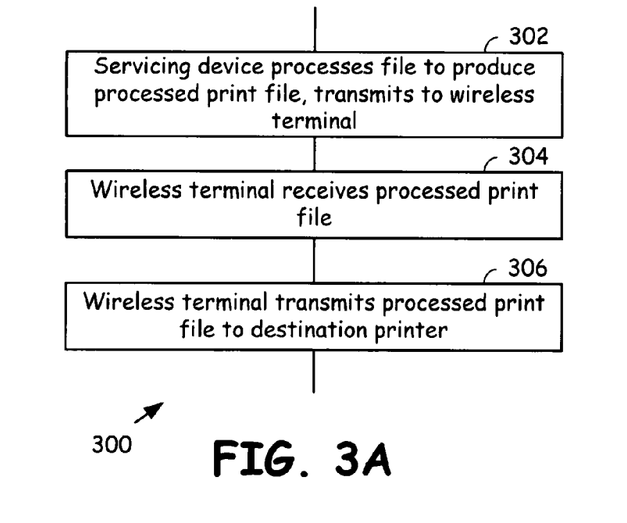
FIG. 3A is a flow chart illustrating operation according to a first aspect of the present invention.

FIG. 3A is a flow chart illustrating operation according to a first aspect of the present invention. The operation 300 of FIG. 3A is generally directed to a scenario in which the processed print file which is prepared by a servicing device passes through the wireless terminal on its route to the destination printer. Operation 300 begins with the servicing device processing the file to produce a processed print file and transmitting the processed print file to the wireless terminal (Step 302). Operation continues with the wireless terminal receiving the processed print file (Step 304). Operation concludes with the wireless terminal transmitting the processed print file to the destination printer (Step 306). The operations of Step 302-306 would be performed between Step 216 and optional Step 218 of FIG. 2. With the aspect of FIG. 3A, optional Step 218 of FIG. 2 may not be required because the wireless terminal itself would determine at what point the processed print file had been sent to the destination printer.

Figure 3B:
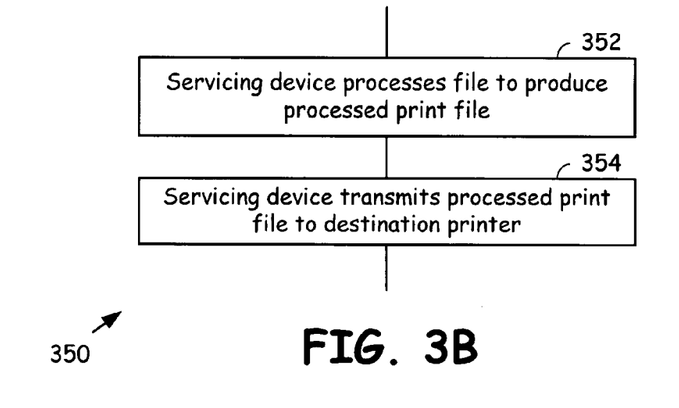
FIG. 3B is a flow chart illustrating operation according to a second aspect of the present invention.

FIG. 3B is a flow chart illustrating operation according to a second aspect of the present invention. The operation 350 of FIG. 3B occurs when the servicing device processes the file to produce the processed print file and then transmits it directly to the destination printer. Thus, in a first operation, the servicing device processes the file to produce a processed print file (Step 352). The servicing device would typically include software and print drivers necessary to process the file into a processed print file that is suitable for receipt by the destination printer. Such processing is based upon instructions received from the wireless terminal. After the servicing device has processed the file to produce the processed print file, operation continues with the servicing device transmitting the processed print file to the destination printer (Step 354). The operation 350 of FIG. 3B would occur after Step 216 of FIG. 2 and before optional Step 218 of FIG. 2.

Figure 4:
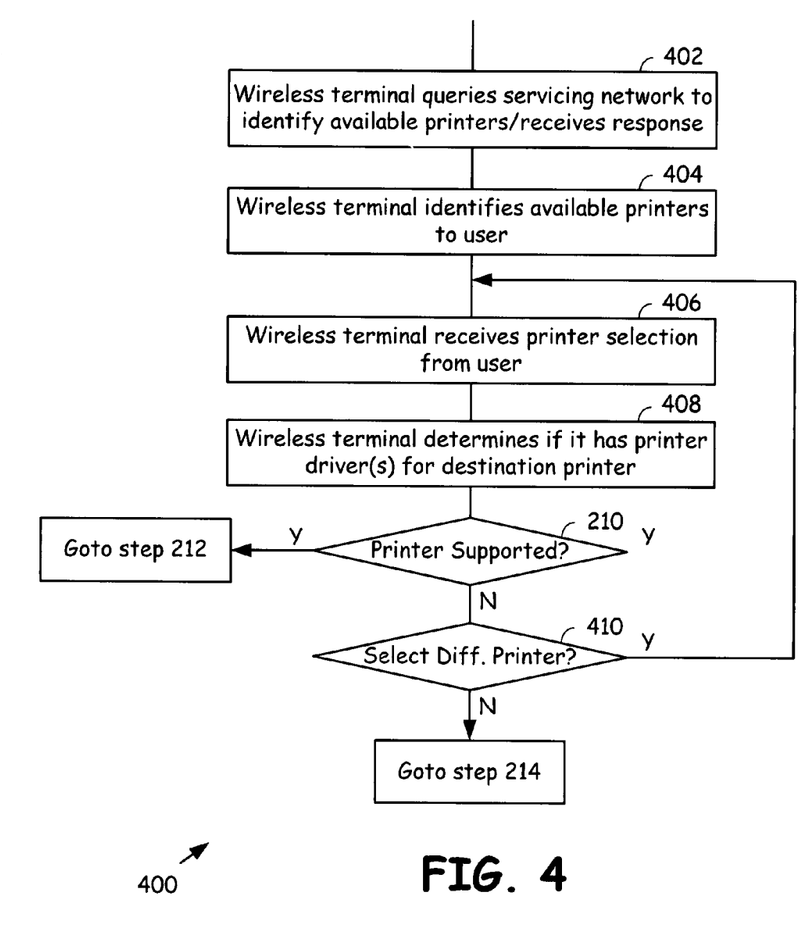
FIG. 4 is a flow chart illustrating operation according to the present invention in more detail with regard to selection of a destination printer.

FIG. 4 is a flow chart illustrating operation according to the present invention in more detail with regard to selection of a destination printer. Referring to FIG. 4, the operations 400 illustrate alternate and complimentary operations of Steps 206-210 of FIG. 2. However, Step 208 may also be employed in conjunction with the operation 400 of FIG. 4. Operation 400 commences with the wireless terminal querying a servicing network to identify available printers and in receiving a response to the query from the servicing network (Step 402).

Referring again to FIG. 1, a wireless terminal 118, which is a PDA, may support both WPAN operations and WLAN operations. Thus, at Step 402, the wireless terminal 118 may send out a Bluetooth query to discover available printers coupled to the PDA 118 via a Bluetooth WPAN. Further, the wireless terminal 118 may send out a query via the WLAN 104 in order to discover available printers directly serviced by the WLAN 104 or indirectly serviced by the WLAN 104. In such case, the PDA 118 would discover printers 112 and 113 as being available. Then, the wireless terminal 118 identifies the available printers 112 and 113 to the user of the wireless terminal (Step 404). The wireless terminal may receive a printer selection from the user via a user interface on the wireless terminal (Step 406). Then, the wireless terminal 408 determines whether it has printer drivers installed for the destination printer and otherwise supports the selected printer, e.g., printer 113 (step 408).

If the selected printer 113 is supported, as determined at Step 210, operation continues at Step 212 wherein the wireless terminal prints directly to the destination printer. However, if the printer 113 is not supported, the wireless terminal may present an option to the user of selecting a different printer, e.g., printer 112 (Step 410). If the user of the wireless terminal 118 desires to select the different printer at Step 410, operation returns to Step 406 where the printers are presented again to the user for selection. However, if only a single printer was previously identified, operation would not return to Step 406 and instead would go to step 214. If the user opts not to select a different printer at Step 410, operation also proceeds to Step 214 where processing according to the present invention is performed in attempting to print the file.

Figure 5:
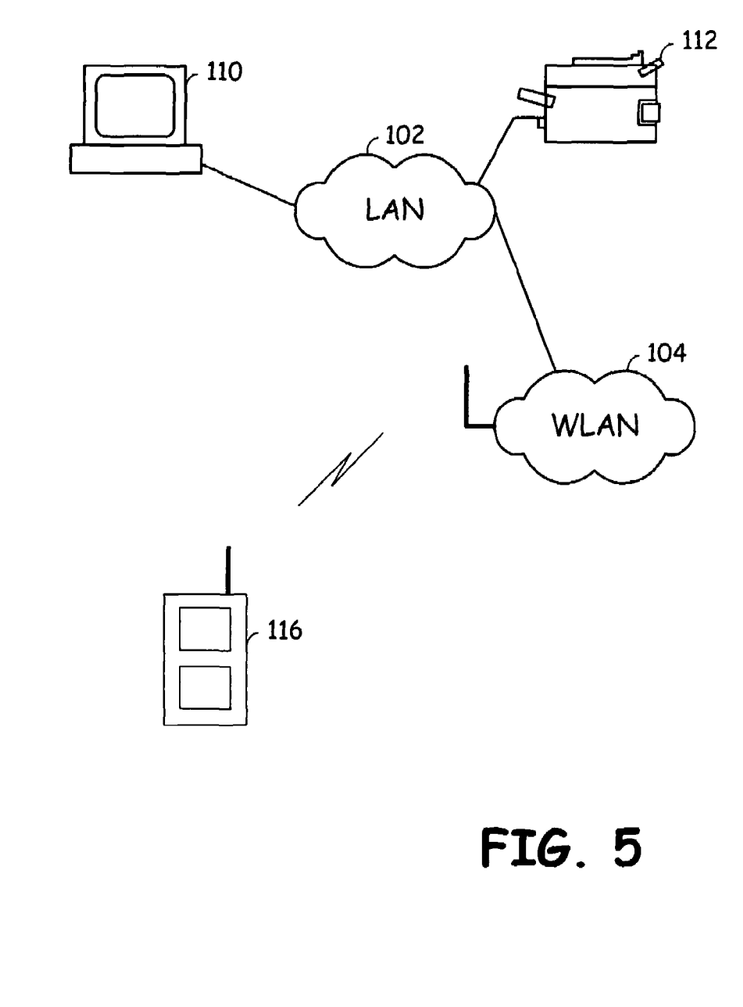
FIG. 5 is a partial system diagram illustrating a first particular example of operation according to an embodiment of the present invention.

FIG. 5 is a partial system diagram illustrating a first particular example of operation according to an embodiment of the present invention. Wireless telephone 116 is serviced by WLAN 104. WLAN 104 couples to LAN 102 which couples to computer 110 and printer 112. The user of wireless telephone 116 receives a file attached to an email. The user of the wireless telephone 116 desires to make a hard copy of the received file. Thus, as a first operation, the wireless terminal 116, upon receipt of the print request from the user, searches for an identified destination printer 112. However, the wireless telephone 116 determines that it does not support printing of the file at the destination printer 112. Thus, the wireless telephone 116 identifies computer 110 as a servicing device for processing of the file for printing at the destination printer. Then the wireless telephone 116 transmits the file to the servicing device 110 via the servicing wireless network WLAN 104 and LAN 102. Computer 110 processes the file and sends the print job to printer 112. The computer 110 then sends notification to the wireless telephone 116 that the file has been delivered to the destination printer for printing.

In an alternate operation, the computer 110 would receive the file and process the file to produce the processed print file in a format that is supported by printer 112. The servicing device, computer 110, would then transmit the processed print file to the wireless telephone 116 for its further use. The wireless terminal 116 may store this processed print file for subsequent delivery to a printer. Alternatively, the wireless telephone 116 may immediately deliver the processed print file to its destination printer 112.

Figure 6:
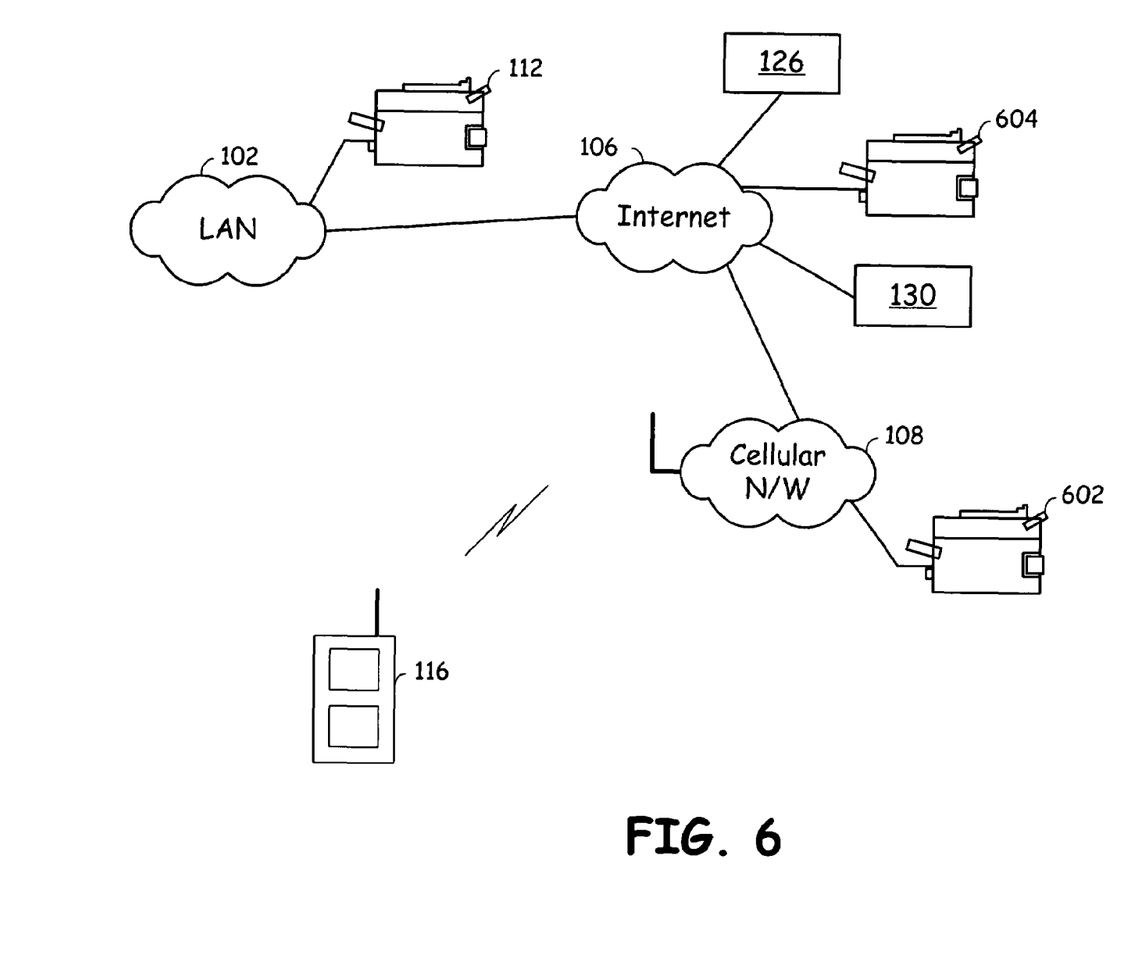
FIG. 6 is a partial system diagram illustrating a second particular example of operation according to an embodiment of the present invention.

FIG. 6 is a partial system diagram illustrating a second particular example of operation according to an embodiment of the present invention. A wireless telephone 116 is serviced by cellular network 108 and is coupled to the Internet 106. Internet 106 couples to LAN 102 and to destination printer 112. In the example of FIG. 6, the wireless telephone 116 receives a file via the cellular network 108. The user of the wireless telephone 116 desires to print the file to obtain a hard copy thereof. Thus, the wireless terminal 116 attempts to identify one or more destination printers.

According to the example of FIG. 6, the wireless terminal 116, via interaction with the cellular network 108, the Internet 106, and the LAN 102 identifies printers 112, 602, and 604 as potential destination printers. The wireless terminal then presents the identities of these available printers 112, 602, and 604 to the user of the wireless terminal via a user interface of the wireless terminal 116. The wireless terminal then receives input from the user via the user interface to indicate a selection of a destination printer, e.g., 602. The wireless terminal 116 also identifies a servicing device for processing of the file for printing at the destination printer 602. In such case, the cellular telephone 116 identifies server computer 130 as the servicing device. The servicing device 130 may be a device to which the wireless telephone 116 subscribes. Alternatively, the servicing device 130 may correspond to a service provider of the wireless telephone 116. Still alternatively, the servicing device 130 may be provided by an employer of the user of the wireless telephone 116. Then, the wireless terminal 116 wirelessly transmits the file to the servicing device 130 via the servicing wireless network, cellular network 108, and via the Internet 106.

According to one aspect to the present invention, the servicing device 130 also receives printer information that includes the network address of the destination printer 602.

Such network address would be provided along with the file from the wireless telephone 116. With this information, the servicing device 130 prepares a processed print file from the receive file. Then, the servicing device 130 transfers the file directly to destination printer 602 via the Internet 106 and the cellular network 108. In an alternate operation, the servicing device 130 processes the file to produce the processed print file and then returns the processed print file to the wireless telephone 116 via the Internet 106 and the cellular network 108. The cellular telephone 116 then transmits the processed print file via the cellular network 108 to the destination printer 602 for printing.

FIG. 7 is a block diagram illustrating a wireless terminal that operates according to the present invention. As shown in FIG. 7, the wireless terminal 700 includes a first wireless interface 702, an optional second wireless interface 704, a processing unit 706, memory 708, user interface 710, device specific components 712, and a battery 714. The wireless terminal 700 may include a camera 716. The components of the wireless terminal 700 are typically contained within a hard case that provides protection from the elements. The wireless interface(s) 702 (and 704) will have particular structure and functionality based upon requirements of the wireless terminal 700. For example, when the wireless terminal 700 is a cellular telephone, the wireless interface 704 will support a corresponding interface standard. The wireless interface 702 of the wireless telephone 700 may also/alternately support WWAN, WLAN, and/or WPAN functionality. For example, when the wireless terminal 700 is a cellular telephone, the wireless interface 702 will support a corresponding interface standard e.g., GSM, GPRS, EDGE, UMTS, 1xRTT, 1xEV-DO, 1xEV-DV, etc. The wireless terminal 700 may also/alternately support WLAN, and/or WPAN functionality. In such case, the optional wireless interface 704 will support standardized communication according to the IEEE 802.11x group of standards, for example. When the wireless terminal is also WPAN device, the optional wireless interface 704 supports the Bluetooth interface standard or another WPAN standard such as the IEEE 802.15 standard. In any case, the wireless interfaces 702 and 704 may support all or a subset of cellular telephone, WLAN and WPAN operations.

The processing unit 706 may include any type of processor such as a microprocessor, a digital signal processor, an Application Specific Integrated Circuit (ASIC), or a combination of processing type devices. The processing unit 706 is operable to execute a plurality of software instructions that are stored in memory 708 and downloaded for execution. The processing unit 706 may also include specialized hardware required to implement particular aspects of the present invention. Memory 708 may include SRAM, DRAM, PROM, flash RAM, a hard disk drive, an optical media drive, or any other type of memory capable of storing data and instructions.

A user interface 710 may include a microphone, a speaker, a keypad, a screen, a touch screen, a cursor control device, a light, a voice recognition system, an optical recognition system that would authenticate a user's iris, for example, and/or any other type of interface that may be employed in the wireless terminal. In some embodiments, the user interface 710 may include therewith ability to service a headset including a microphone and an earpiece for the user. Battery 714 powers the components of the wireless terminal 700. Devices that make up the device specific components 712 are based upon the particular construct of the wireless terminal 700. For example, when the wireless terminal 700 is a digital camera, the device specific components will be different than those of an MP3 player. The reader will appreciate this requirement.

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the terms "communicatively coupled" or "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents, and alternatives falling within the spirit and scope of the present invention as defined by the claims.

The invention claimed is:

1. A method for operating a wireless terminal, the method comprising:
    receiving a request from a user of the wireless terminal to print a file;
    identifying a destination printer;
    determining that the wireless terminal does not include printer driver software to process the file to generate a processed print file;
    identifying a servicing device that includes printer driver software to process the file to produce the processed print file for printing at the destination printer; and
    wirelessly transmitting the file to the servicing device via the servicing wireless network;
    the servicing device employing its included printer driver software to process the file to produce the processed print file;
    the servicing device transmitting the processed print file to the wireless terminal;
    receiving the processed print file that has been transmitted to the wireless terminal from the servicing device via the servicing wireless network, the processed print file supported by the destination printer; and
    transmitting the processed print file via the servicing wireless network from the wireless terminal to the destination printer for printing.

2. The method of claim 1, further comprising receiving a confirmation that the file has been delivered to the destination printer for printing.

3. The method of claim 1, wherein the servicing device is a server computer.

4. The method of claim 1, further comprising transmitting information regarding the destination printer to the servicing device via the servicing wireless network, the information including a network address of the destination printer.

5. The method of claim 1, wherein:
the wireless terminal is a wireless local area network (WLAN) telephone, a wireless personal area network (WPAN) telephone, a wireless metropolitan area network (WMAN) telephone, or a cellular telephone.

6. The method of claim 1, further comprising:
the servicing device employing its included printer driver software to process the file to produce the processed print file, the processed print file supported by the destination printer; and
the servicing device transmitting the processed print file to the destination printer for printing.

7. The method of claim 1, wherein identifying a destination printer comprises:
identifying at least one available printer that is available to the wireless terminal for printing;
presenting at least one identity of the at least one available printer to the user of the wireless terminal via a user interface of the wireless terminal; and
receiving input from the user via the user interface to indicate a selection of the destination printer.

8. The method of claim 1, wherein:
the file is an email attachment, a file downloaded from a server coupled to the Internet, a file downloaded from a computer on the Internet, or a file delivered to the wireless terminal from at least one additional wireless terminal.

9. The method of claim 1, wherein determining that the wireless terminal does not support printing of the file at the destination printer comprises the wireless terminal determining that it does not support a file type of the file.

10. The method of claim 1, wherein the servicing device is the destination printer and further comprising:
the destination printer receiving the file;
the destination printer processing the file to produce the processed print file; and
the destination printer printing the processed print file.

11. The method of claim 10, further comprising:
the destination printer determining that it cannot process the file to produce the processed print file; and
the destination printer acquiring resources to process the file to produce the processed print file.

12. A wireless terminal, comprising:
a wireless interface;
a user interface including a user input device and a display; and
a processing unit communicatively coupled to the wireless interface and to the user interface and operable to:
receive a request via the user interface to print a file;
identify a destination printer;
determine that the wireless terminal does not include printer driver software to process the file to generate a processed print file;
identify a servicing device that includes printer driver software to process the file to produce the processed print file for printing at the destination printer; and
transmit the file to the servicing device via the wireless interface and the
servicing wireless network; and wherein:
the servicing device employs its included printer driver software to process the file to produce the processed print filet;
the servicing device transmitting the processed print file to the wireless terminal;
the processing unit receives the processed print file from the servicing device via the servicing wireless network and the wireless interface, the processed print file supported by the destination printer; and
the processing unit transmits the processed print file via the wireless interface and the servicing wireless network to the destination printer for printing.

13. The wireless terminal of claim 12, wherein the processing unit is further operable to receive a confirmation that the file has been delivered to the destination printer for printing via the wireless interface and the servicing wireless network.

14. The wireless terminal of claim 12, wherein the servicing device is a server computer.

15. The wireless terminal of claim 12, wherein the processing unit is further operable to transmit information regarding the destination printer to the servicing device via the wireless interface and the servicing wireless network, the information including a network address of the destination printer.

16. The wireless terminal of claim 12, wherein:
the wireless terminal is a wireless local area network (WLAN) telephone, a wireless personal area network (WPAN) telephone, a wireless metropolitan area network (WMAN) telephone, or a cellular telephone.

17. The wireless terminal of claim 12, wherein in identifying a destination printer, the processing unit is operable to:
identify at least one available printer that is available to the wireless terminal for printing;
present at least one identity of the at least one available printer to a user of the wireless terminal via the user interface; and
receive input from the user via the user interface to indicate a selection of the destination printer.

18. The wireless terminal of claim 12, wherein:
the file is an email attachment, a file downloaded from a server coupled to the Internet, a file downloaded from a computer on the Internet, or a file delivered to the wireless terminal from at least one additional wireless terminal.

19. The wireless terminal of claim 12, wherein in determining that the wireless terminal does not support printing of the file at the destination printer, the processing unit is operable to determine that the wireless terminal does not support a file type of the file.

20. A method for printing a file by a wireless terminal, the method comprising:
the wireless terminal receiving a request from a user of the wireless terminal to print the file;
the wireless terminal identifying a destination printer;
the wireless terminal determining that the wireless terminal does not include printer driver software to process the file to generate a processed print file;
the wireless terminal identifying a servicing device that includes printer driver software to process the file to produce the processed print file for printing at the destination printer;
the wireless terminal wirelessly transmitting the file and information regarding the destination printer to the servicing device via the servicing wireless network, the information regarding the printer including a network address of the destination printer;
the servicing device employing its included printer driver software to process the file to produce a processed print file, the processed print file supported by the destination printer;

the servicing device transmitting the processed print file to the wireless terminal;

the wireless terminal receiving the processed print file that has been transmitted to the wireless terminal from the servicing device via the servicing wireless network; and transmitting the processed print file via the servicing wireless network from the wireless terminal to the destination printer for printing.

* * * * *